United States Patent
Harris et al.

(10) Patent No.: US 7,272,128 B2
(45) Date of Patent: Sep. 18, 2007

(54) FRAME SELECTION AND DISTRIBUTION UNIT (SDU) AND METHOD FOR DYNAMICALLY MANAGING WIRELESS CALL SETTINGS

(75) Inventors: John M. Harris, Chicago, IL (US); Lena Srey, Chicago, IL (US); Shalabh Kakkar, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 1075 days.

(21) Appl. No.: 10/232,021

(22) Filed: Aug. 30, 2002

(65) Prior Publication Data
US 2004/0042410 A1    Mar. 4, 2004

(51) Int. Cl.
  *H04Q 7/24* (2006.01)
  *H04Q 7/20* (2006.01)
  *H04J 3/14* (2006.01)

(52) U.S. Cl. .............. 370/338; 370/252; 370/328; 455/452.2

(58) Field of Classification Search ............... 370/335, 370/338, 352–356, 401, 468, 252, 349, 486, 370/487, 328; 455/452.2, 450; 450/452.2
See application file for complete search history.

(56) References Cited

U.S. PATENT DOCUMENTS

| 5,594,739 | A | * | 1/1997 | Lemieux | 370/350 |
| 6,023,458 | A | * | 2/2000 | Tweedy et al. | 370/328 |
| 6,148,207 | A | | 11/2000 | Baum et al. | |
| 2002/0009134 | A1 | * | 1/2002 | Fischel et al. | 375/224 |
| 2002/0090004 | A1 | * | 7/2002 | Rinchiuso | 370/468 |
| 2002/0118649 | A1 | * | 8/2002 | Farley et al. | 370/252 |
| 2003/0231594 | A1 | * | 12/2003 | Xu et al. | 370/236 |

* cited by examiner

*Primary Examiner*—Afsar Qureshi
(74) *Attorney, Agent, or Firm*—Jeffrey K. Jacobs

(57) ABSTRACT

The present application describes various embodiments that address the need to dynamically manage wireless call settings to more optimally utilize system capacity. When a radio access network (RAN)(e.g., 105, 110, and 120) receives a data packet (e.g., 200) associated with a wireless call, it determines an application type associated with the data packet and/or an internet domain associated with the call. The RAN then adjusts call settings associated with the wireless call based on the application type and/or on the internet domain. In this manner, call settings such as, but not limited to, a target frame error rate, radio link protocol (RLP) parameters, a supplemental traffic channel (SCH) assignment priority, a carrier assignment group, and a billing rate can be applied more dynamically with respect to services used in the call.

16 Claims, 2 Drawing Sheets

FRAME SELECTION AND DISTRIBUTION UNIT (SDU) AND METHOD FOR DYNAMICALLY MANAGING WIRELESS CALL SETTINGS

FIELD OF THE INVENTION

The present invention relates generally to wireless communications and, in particular, to dynamically managing wireless call settings.

BACKGROUND OF THE INVENTION

In 3G ($3^{rd}$ generation) wireless systems (i.e., cdma2000: 3G 1X, 1X-EV-DO, etc.), call settings such as the target frame error rate (FER) for the supplemental channel (SCH) can impact user throughput and overall system throughput. In contrast to voice calls, the traffic generated by packet data calls (e.g., web browsing, email downloading, etc.) is very bursty and highly varying, with small durations of high traffic separated by larger durations of little or no traffic. There are a growing number of applications using the SCH air-interface to provide service to wireless clients. Some of these applications can tolerate a higher radio link protocol (RLP) abort rate than others, and thus a higher FER than others. Accordingly, it is a poor means of utilizing system capacity to have static SCH FER settings for data calls when different types of application traffic are present.

In many existing implementations, the target SCH FER is statically set to 5% for all types of data calls. Simultaneously, there may be users running applications not requiring a 5% FER, who could afford a higher FER, while others requiring a FER less than 5%. Lab results show that if the target SCH FER is set too low, user throughput increases to nearly the physical layer throughput. However, this comes at the cost of a high traffic channel gain, or a larger share of base station power. As a result, fewer users can be served. In contrast, a higher FER requires a lower traffic channel gain and a correspondingly smaller share of the base station power, allowing more users to be served simultaneously. However, if the target SCH FER is set too high, user throughput drops due to the increased number of retransmissions. Moreover, the increased number of retransmissions can result in increased user delay.

Therefore, a need exists for an apparatus and method for dynamically managing wireless call settings to more optimally utilize system capacity.

DETAILED DESCRIPTION OF EMBODIMENTS

The present application describes various embodiments that address the need to dynamically manage wireless call settings to more optimally utilize system capacity. When a radio access network (RAN) receives a data packet associated with a wireless call, it determines an application type associated with the data packet and/or an internet domain associated with the call. The RAN then adjusts call settings associated with the wireless call based on the application type and/or on the internet domain. In this manner, call settings such as, but not limited to, a target frame error rate, radio link protocol (RLP) parameters, a supplemental traffic channel (SCH) assignment priority, a carrier assignment group, and a billing rate can be applied more dynamically with respect to services used in the call.

Figure 1:
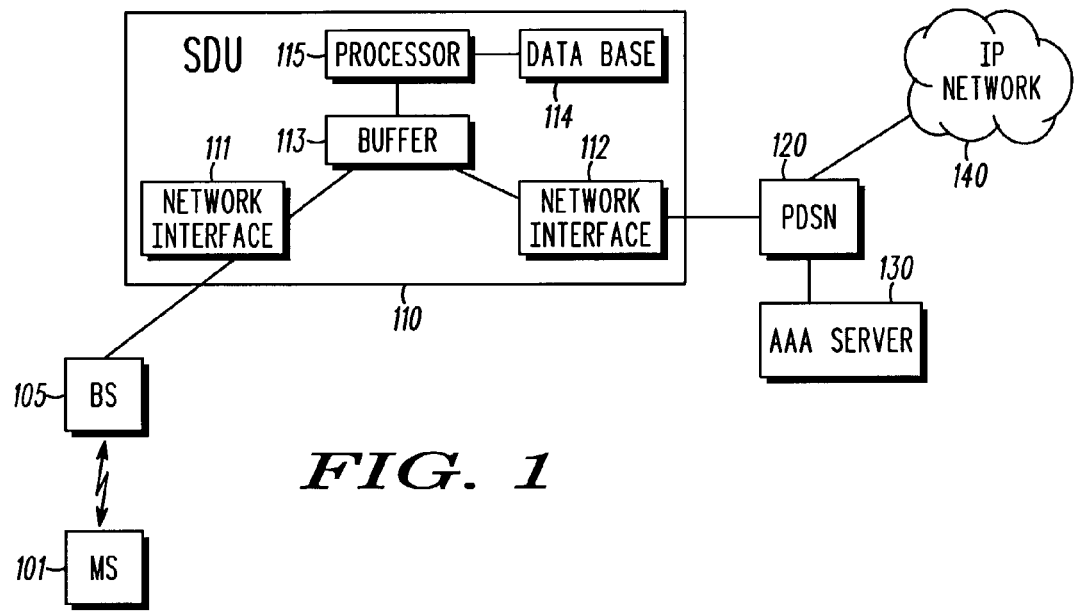
FIG. 1 is a block diagram depiction of a wireless communication system in accordance with an embodiment of the present invention.
Figure 2:
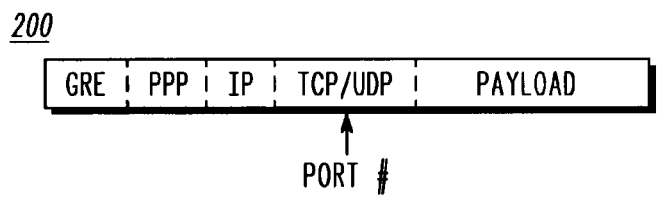
FIG. 2 is a block diagram depiction of a GRE packet in accordance with an embodiment of the present invention.
Figure 3:
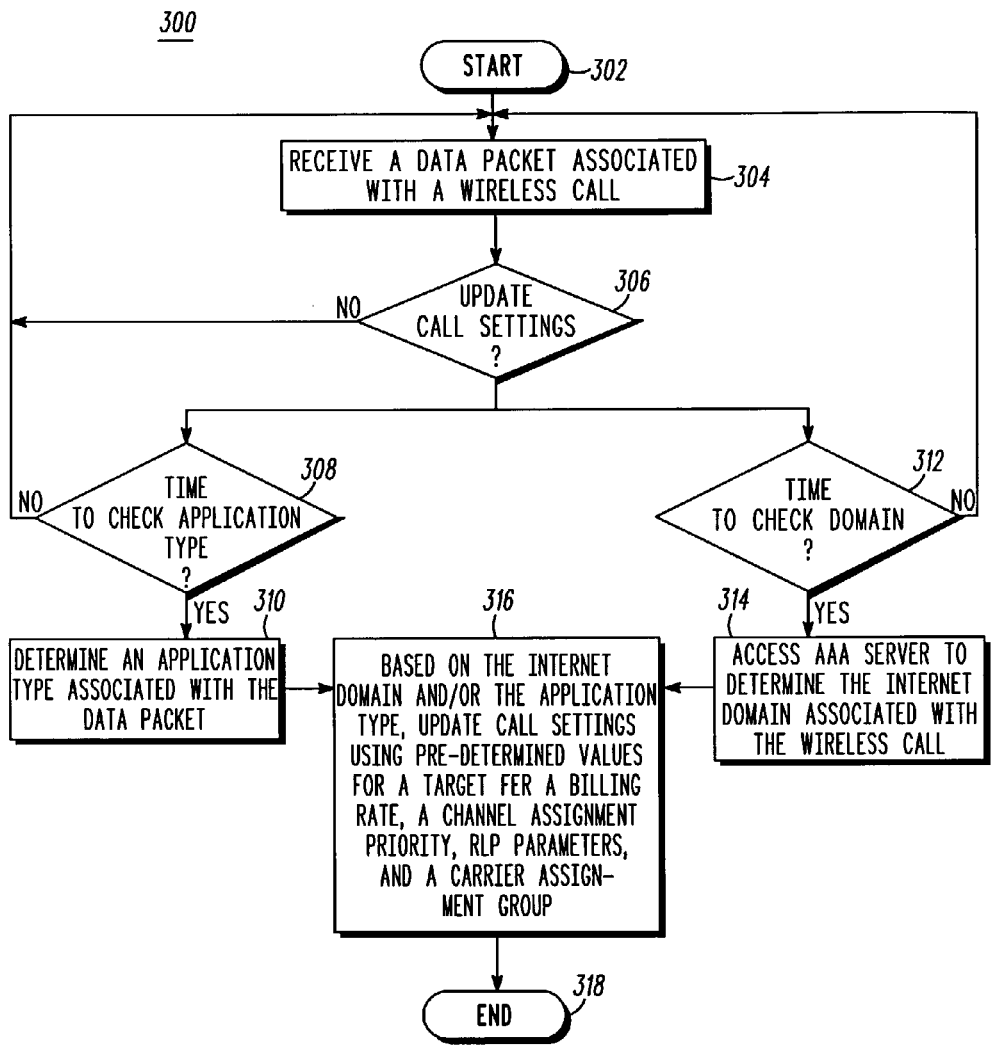
FIG. 3 is a logic flow diagram of steps executed by an SDU in accordance with an embodiment of the present invention.

The disclosed embodiments can be more fully understood with reference to FIGS. 1-3. FIG. 1 is a block diagram depiction of a wireless communication system 100 in accordance with a first embodiment of the present invention. Communication system 100 is a well-known Code Division Multiple Access (CDMA) system, specifically a CDMA 2000 system, which is based on the Telecommunications Industry Association/Electronic Industries Association (TIA/EIA) standard IS-2000, suitably modified to implement the present invention. However, the present invention is not limited to a particular wireless technology. Therefore, in alternate embodiments, communication system 100 may utilize other communication system protocols such as, but not limited to, UMTS, 1x EVDV, 1x EVDO, GPRS, EDGE, and WLANs.

The first embodiment of the present invention includes a radio access network (RAN) and remote units, such as mobile station (MS) 101. However, the present invention is not limited to remote units that are mobile. For example, a remote unit may comprise a desktop computer wirelessly connected to the radio access network.

Those skilled in the art will recognize that FIG. 1 does not depict all of the network equipment necessary for system 100 to operate but only those logical entities particularly relevant to the description of embodiments of the present invention. For example, system 100 comprises well-known entities such as base site 105, frame selection and distribution unit (SDU) 110, Authentication, Authorization and Accounting (AAA) server 130, and packet data serving node (PDSN) 120, which interfaces with internet protocol (IP) network 140. Those skilled in the art are aware of the many ways each of these entities can be implemented and/or purchased from wireless communications companies such as "MOTOROLA."

SDU 110 comprises well-known data communication entities such as network interfaces 111 and 112, frame buffer 113, database 114, and processor 115. These data communication entities typically comprise components such as processors, memory, and/or logic circuitry designed to implement algorithms that have been expressed as computer instructions and/or in circuitry. Given an algorithm or a logic flow, those skilled in the art are aware of the many design and development techniques available to implement an SDU that performs the given logic.

Although not explicitly shown, system 100 further comprises base transceiver stations (BTSs), which interface with devices such as base site controllers (BSCs), mobile switching centers/virtual location registers (MSC/VLR), home location registers (HLR), etc. In a first embodiment of the present invention, a known CDMA 2000 RAN is adapted using known telecommunications design and development techniques to implement the logic of the present invention. The result is the RAN of system 100 (e.g., BS 105, SDU 110, and PDSN 120), which performs the method described with respect to FIG. 3. Those skilled in the art will recognize that the present invention may be implemented in and across various physical components of the system 100 RAN, not just in SDU 110 as described with respect to the first embodiment.

Operation of a first embodiment, in accordance with the present invention, occurs substantially as follows. When MS 101 is involved in a wireless call that uses a data service such as web browsing, for example, data packets are routed to and from MS 101 via SDU 110. Thus, network interfaces 111 and 112 are sending and receiving such data packets to and from base sites (e.g., BS 105) and PDSN 120, respectively. Frame buffer 113 stores data packets for processing by processor 115, and database 114 stores call settings for individual application types and for individual internet domains.

In the first embodiment, call settings such as a target frame error rate, radio link protocol (RLP) parameters, a supplemental traffic channel (SCH) assignment priority, a carrier assignment group, and a billing rate are stored for certain application types and for certain internet domains as well as a set of default call settings. Individual call settings may be stored for application types such as real-time voice, real-time streaming video, video phone, Transmission Control Protocol (TCP), User Datagram Protocol (UDP), and Wireless Application Protocol (WAP). In the first embodiment, these call settings are pre-determined by network operators, presumably set to balance quality of service and system capacity concerns for particular application types and particular internet domains.

For example, a real-time audio application may be more optimally supported by setting a relatively low FER target to minimize the number of packets that must be retransmitted or that are lost because retransmission takes too much time. RLP parameters such as the number of rounds and the number of NACKs per round may be more optimally set to abort retries quickly, since a real-time audio application may just dump late arriving packets anyway. Similarly, call settings for SCH assignment priority, carrier assignment group, and billing rate can be determined by network operators to apply to individual applications.

As with particular applications, network operators can specify call settings to apply to particular internet domains. For example, network operators could establish a special set of call settings for an internet domain from which users download music to optimize system resources as well as perhaps to reflect special billing agreements made with the domain operator. In alternative embodiments of the present invention, only a subset of the call settings mentioned above may be individually set and they may only be set on either an application-by-application or a domain-by-domain basis, but not both as with the first embodiment.

During a wireless data call involving MS 101, SDU 110 receives data packets from MS 101 via base site 105. If this call involves data networks external to the RAN (e.g., web browsing), then SDU 110 may also receive data packets via IP network 140 and PDSN 120. At least some of the received data packets are stored in frame buffer 113. In order to apply the call settings stored in database 114, processor 115 determines the application type associated with a data packet from the wireless call.

In the first embodiment of the present invention, processor 115 does this by examining the port number in the transport protocol header of the data packet. Since each data packet is or at least comprises a general routing encapsulation (GRE) packet, obtaining the port number simply requires using an offset value (i.e., a pointer) to examine the portion of the packet containing the port number. This is illustrated in FIG. 2, which shows an exemplary GRE packet containing a GRE header, a PPP header, an IP header, and a TCP/UDP header. As shown the TCP/UDP header includes a port number field. Since each port is mapped to an application, this port number will indicate the application type currently associated with the wireless call. Processor 115 then adjusts the call settings associated with the wireless call based on the call settings stored in database 114 for the application type determined.

Also during a wireless data call in which MS 101 is accessing one or more internet domains, processor 115 may also adjust the call settings based on the call settings stored in database 114 for the internet domain of the wireless call. To determine the current internet domain of the call, SDU 110 queries AM server 130 via PDSN 120. Network interface 112 receives the internet domain associated with the wireless call from AAA server 130 via PDSN 120. Processor 115 then adjusts the call settings accordingly. While the call settings are primarily adjusted within SDU 110 (and applied to the call in subsequent SDU processing), a new billing rate is communicated to a billing server within the RAN.

FIG. 3 is a logic flow diagram of steps executed by an SDU in accordance with the first embodiment of the present invention. Logic flow 300 begins (302) when a data packet associated with a wireless call is received (304). If it is time to possibly update the call settings (306), then the logic proceeds, otherwise it restarts. Processing to determine whether the call settings should be adjusted is performed on a periodic basis after an initial determination at the beginning of the call, in the first embodiment.

The rate at which the application type is determined verses the internet domain is determined differs. Because the application type can be determined relatively quickly from the data packet, it can be monitored more often. In fact, in the first embodiment, the determinations are synchronized with the transmission of Extended Supplemental Channel Assignment Messages (ESCAMs) on the SCH. The periodic determinations are scheduled to occur just prior to each cycle of periodically updating (i.e., announcing) the target FER in the ESCAMs. Thus, an application type change can be detected and the target FER subsequently adjusted quite responsively.

In other words, when it is time to check the application type (308) the determination is made using the data packet (310), and the predetermined call settings are applied based on the application type determined (316). Similarly, when it is time to check the internet domain of the call (312), the AAA server is accessed (314), and the pre-determined call settings are applied based on the domain determined (316). In the first embodiment, the domain is determined each time a new upload or download begins, i.e., when data traffic resumes after a 3 second or longer gap. In alternative embodiments, the domain may be determined more periodically, e.g., once per second when there is data to inspect.

As embodied above, the present invention allows network operators to establish call settings for individual applications and internet domains that are better tailored to the requirements of the particular services involved. Since these call settings are dynamically applied during a call as the services utilized change, it is possible to increase both the quality of service experienced by a user and the capacity of the system, by optimizing call setting trade-offs on a per-service basis.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a nonexclusive inclusion, such that a process, method, article of manufacture, or apparatus that comprises a list of elements does not include only those elements in the list, but may include other elements not expressly listed or inherent to such process, method, article of manufacture, or apparatus. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically or electrically. The term "program" (or "programming"), as used herein, is defined as a sequence of instructions designed for execution on a computer system. A program, programming, or computer program, may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for dynamically managing wireless call settings comprising:
   receiving by a radio access network (RAN) a data packet associated with a wireless call;
   determining an application type associated with the data packet; and
   adjusting at least one call setting associated with the wireless call based on the application type, wherein determining the application type associated with the data packet comprises obtaining a portion of a transport protocol header of the data packet, wherein the portion of the transport protocol header comprises a port number, and wherein adjusting the at least one call setting associated with the wireless call based on the application type comprises at least one of
   updating a target frame error rate for the wireless call,
   updating a billing rate for the wireless call,
   updating a channel assignment priority for the wireless call,
   selecting at least one new radio link protocol (RLP) parameter to apply to the wireless call, and
   selecting a new carrier assignment group to apply to the wireless call.

2. The method of claim 1, wherein the data packet is received via a data network external to the RAN.

3. The method of claim 1, wherein the data packet is received from a mobile unit involved in the wireless call.

4. The method of claim 1, wherein determining the application type associated with the data packet comprises determining the application type associated with the port number.

5. The method of claim 1, wherein the data packet comprises a general routing encapsulation (GRE) packet.

6. The method of claim 1, wherein the application type comprises an application type selected from the group consisting of real-time audio, real-time streaming video, video phone, Transmission Control Protocol (TCP), User Datagram Protocol (UDP), Wireless Application Protocol (WAP).

7. The method of claim 1, wherein the channel assignment priority indicates an assignment priority for assignment of a supplemental traffic channel.

8. The method of claim 1, wherein the at least one new RLP parameter comprises at least one parameter selected from the group consisting of number of rounds and number of NACKs per round.

9. The method of claim 1, further comprising:
   receiving a plurality of data packets during the wireless call;
   periodically determining an application type associated with individual data packets of the plurality of data packets; and
   periodically updating a target frame error rate for the wireless call.

10. The method of claim 9, wherein each cycle of periodically determining an application type is scheduled just prior to each cycle of periodically updating the target frame error rate for the wireless call and wherein the target frame error rate is updated each cycle based on the determination of an application type scheduled just prior.

11. The method of claim 10, wherein periodically updating a target frame error rate for the wireless call comprises sending an Extended Supplemental Channel Assignment Message (ESCAM) on a supplemental traffic channel.

12. A method for dynamically managing wireless call settings comprising:
   receiving by a radio access network (RAN) a data packet associated with a wireless call;
   determining an internet domain associated with the wireless call; and
   adjusting at least one call setting associated with the wireless call based on the internet domain, wherein adjusting the at least one call setting associated with the wireless call based on the internet domain comprises at least one of
   updating a target frame error rate for the wireless calls,
   updating a billing rate for the wireless call,
   updating a channel assignment priority for the wireless call,
   selecting at least one new radio link protocol (RLP) parameter to apply to the wireless call, and
   selecting a new carrier assignment group to apply to the wireless call.

13. The method of claim 12, wherein determining an internet domain associated with the wireless call comprises accessing an Authentication, Authorization and Accounting (AAA) server.

14. A frame selection and distribution unit (SDU) comprising:
   a frame buffer adapted to store a data packet associated with a wireless call;
   a database adapted to store at least one call setting for individual application types; and a processor, operably coupled to the frame buffer and the database, adapted to determine an application type associated with the data packet and adapted to adjust at least one call setting associated with the wireless call based on the at least one call setting stored in the database for the application type, wherein being adapted to determine the application type associated with the data packet comprises being adapted to obtain a portion of a transport protocol header of the data packet, wherein the portion of the transport protocol header comprises a port number, and wherein being adapted to adjust the at least one call setting comprises at least one of being adapted to update a target frame error rate for the wireless call, being adapted to update a billing rate for the wireless call, being adapted to update a channel assignment priority for the wireless call, being adapted to select at least one new radio link protocol (RLP) parameter to apply to the wireless call, and being adapted to select a new carrier assignment group to apply to the wireless call.

15. A frame selection and distribution unit (SDU) comprising:

a database adapted to store at least one call setting for individual internet domains; and a processor, operably coupled to the database, adapted to determine an internet domain associated with the wireless call and adapted to adjust at least one call setting associated with the wireless call based on the at least one call setting stored in the database for the internet domain associated with the wireless call, wherein being adapted to adjust the at least one call setting comprises at least one of being adapted to update a target frame error rate for the wireless calls, being adapted to update a billing rate for the wireless call, being adapted to update a channel assignment priority for the wireless call, being adapted to select at least one new radio link protocol (RLP) parameter to apply to the wireless call, and being adapted to select a new carrier assignment group to apply to the wireless call.

16. The SDU of claim 15, further comprising a network interface adapted to receive the internet domain associated with the wireless call from a packet data serving node (PDSN).

* * * * *

UNITED STATES PATENT AND TRADEMARK OFFICE
CERTIFICATE OF CORRECTION

PATENT NO. : 7,272,128 B2  
APPLICATION NO. : 10/232021  
DATED : September 18, 2007  
INVENTOR(S) : Harris et al.

Page 1 of 1

It is certified that error appears in the above-identified patent and that said Letters Patent is hereby corrected as shown below:

IN THE SPECIFICATION

In Column 2, Line 56, delete "(MSCNLR)," and insert -- (MSC/VLR), --, therefor.

In Column 4, Line 11, delete "AM" and insert -- AAA --, therefor.

IN THE CLAIMS

In Column 6, Line 50, in Claim 12, delete "calls," and insert -- call, --, therefor.

In Column 8, Line 11, in Claim 15, delete "calls," and insert -- call, --, therefor.

Signed and Sealed this

Seventh Day of July, 2009

JOHN DOLL  
*Acting Director of the United States Patent and Trademark Office*